July 17, 1962   N. ANDRES   3,044,839
THRUST BEARINGS

Filed Oct. 29, 1959   2 Sheets-Sheet 1

WITNESSES
Leon J. Faza
E. Herbert Liss

INVENTOR
Nickolas Andres
BY F. P. Taylor
ATTORNEY

July 17, 1962 N. ANDRES 3,044,839
THRUST BEARINGS

Filed Oct. 29, 1959 2 Sheets-Sheet 2

United States Patent Office 3,044,839
Patented July 17, 1962

3,044,839
THRUST BEARINGS
Nickolas Andres, Campbell, Calif., assignor to Westinghouse Electric Corporation, East Pittsburgh, Pa., a corporation of Pennsylvania
Filed Oct. 29, 1959, Ser. No. 849,643
9 Claims. (Cl. 308—160)

The present invention relates to thrust bearings, and more particularly to a thrust bearing designed to overcome high starting resistance due to large thrust loads and high coefficient of friction.

The starting of powered units with high starting thrust loads is a problem which has confronted the bearing art for many years. Present solutions to this problem require prestarting mechanism which are costly and add to the complexity of the bearing. These prior art devices require auxiliary equipment and piping. One such solution provides a device which elevates the bearing runner mechanically prior to starting and separates it from the bearing surface allowing the lubricant to enter between sliding surfaces. Immediately after the runner is released, the unit must be started. Another design provides a hydraulic device which, prior to starting, forces lubricant under high pressure between sliding surfaces to form a lubricant film. Then the unit must immediately be started. Another method proposed by the prior art is to elevate the runner over the shoes hydraulically through an independent hydraulic system. In each of the designs, the load adjusting thrust plate is kept from turning by a stop bolt or a similar arrangement allowing only the adjusting movement of the plate. Film forming devices are separate fixtures. It can thus be seen that all of these methods require complex auxiliary equipment and means to provide immediate starting upon the actuation of the elevating means.

The principal object of the present invention is to provide a simple, economical, improved thrust bearing which automatically reduces break away starting torque due to friction.

Another object of the present invention is to provide a simple, economical thrust bearing having structure which automatically reduces the break away starting torque due to friction by allowing the support plate for the thrust shoes and the shoes themselves to turn nearly a full turn with the thrust runner when starting.

A further object of the present invention is to provide a simple, economical thrust bearing in which the thrust plate is free to turn, and in which the thrust plate activates a simple plunger pump which elevates the runner allowing automatic formation of a lubricant film during starting.

A further object of the present invention is to provide a simple, economical thrust bearing in which the sliding surfaces are automatically protected from high friction resistance during operation as well as at the start.

Other objects and advantages of the invention will be apparent from the following detailed description, taken in conjunction with the accompanying drawings, in which.

Figure 1:
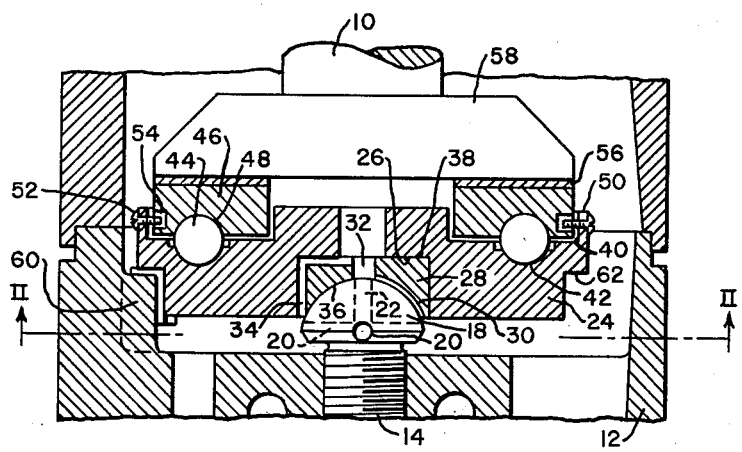
FIGURE 1 is a longitudinal sectional view of the thrust bearing of this invention.

The bearing shown in the drawing is designed particularly for use in a motor-pump unit which is designed to operate in a motor unit which is submerged in the pump fluid. In addition, the pump fluid is used to lubricate the thrust bearing and guide bearings and to cool the motor unit. It will be obvious, however, that this thrust bearing may also be used for numerous other types of equipment with large starting thrust load.

As shown in FIG. 1 the bearing is used to support the shaft 10 against end thrust in a vertical direction. The bearing may be supported by a bracket member 12 which preferably forms part of the housing or frame of a motor which has not been illustrated in the drawings since it forms no part of the invention. A knuckle bolt 14 is threadedly received centrally in end bracket 12. The knuckle bolt 14 has a hemispherical head 18 with radial passages 20 circumferentially spaced around its diametrical edge. These passages extend to the center of the hemispherical head and a central vertical passage 22 as seen in FIG. 1, extends radially upward. These radial passages 20 and central vertical passage 22 permit the flow of the lubricating fluid from the space below the thrust bearing to the space intermediate the parts of the bearing.

The hemispherical head 18 serves as a pivot for a rocker plate 24. Support plate or rocker plate 24 is a substantially disc shaped member having a central recess 26 on its lower side as seen in FIG. 1. Received in the central recess 26 of rocker plate 24 is a bearing-seat 28. Bearing-seat 28 on its lower surface has a hemispherical recess which receives head 18 of knuckle bolt 14. Lubricating passages 30, 32 and 34 are provided in bearing-seat 28 to permit lubricating fluid to pass through the bearing-seat 28 to the thrust runner and shoes. The bearing-seat 28 may be of any suitable bearing material. The bearing-seat 28 received in recess 26 has two sliding surfaces as at 36 and 38. Both of these surfaces are lubricated and friction losses are divided between these two surfaces. If friction on one surface becomes larger than friction on the other surface sliding occurs on the surface with less friction.

An annular recess 40 is provided on the upper surface of rocker or support plate 24. A plurality of circumferentially spaced hemispherical recesses 42 are provided at the base of annular recess 40. Recesses 42 receive pivot balls 44. A plurality of thrust shoes 46 are pivotally received in recess 40 of support plate 24 in circumferentially spaced positions. The thrust shoes 46 have hemispherical depressions 48 on the bottom side, as seen in FIG. 1, and these hemispherical depressions 48 receive pivot balls 44. The pivot balls 44 provide a pivotal mounting for the thrust shoes 46. A peripheral wall 50 is formed by the recess 40 in rocker plate 24. In order to constrain the movement of thrust shoes 46 relative to rocker plate 24 a set screw 52 is provided for each thrust shoe 46 which extends through the peripheral wall 50 into an enlarged recess 54 in the side of the thrust shoe 46. The recess 54 is enlarged relative to the set screw 52 to permit pivotal movement of the thrust shoe 46. The thrust shoes 46 are provided on their upper surface with a suitable bearing material 56. The bearing ring or thrust runner 58 is rigidly secured to the rotatable shaft 10 at its lower end. Thrust runner 58 engages and rides on the bearing surfaces 56 of thrust shoes 46.

An embossment 60 extends radially inward from the bracket 12 adjacent the lower surface of rocker plate 24. The lower portion of rocker plate 24 is of reduced diameter so as to enable it to rotate without engaging the stop embossment 60. The junction of the reduced diameter portion of rocker plate 24 with the remainder of the rocker plate forms a downwardly facing shoulder 62. Mounted on the downwardly facing shoulder 62 is a damper mechanism 64 comprising a damper cylinder 66 having extending from each end thereof a damper 68 of rubber or other suitable material. When a damper 68 engages embossment 60 it damps rocker plate 24 down to a stop. The damper structure 64 and embossment 60 is most clearly seen in FIG. 2. It can thus be seen that the rocker plate 24 is free to rotate no more than one full turn in either direction.

Figure 2:
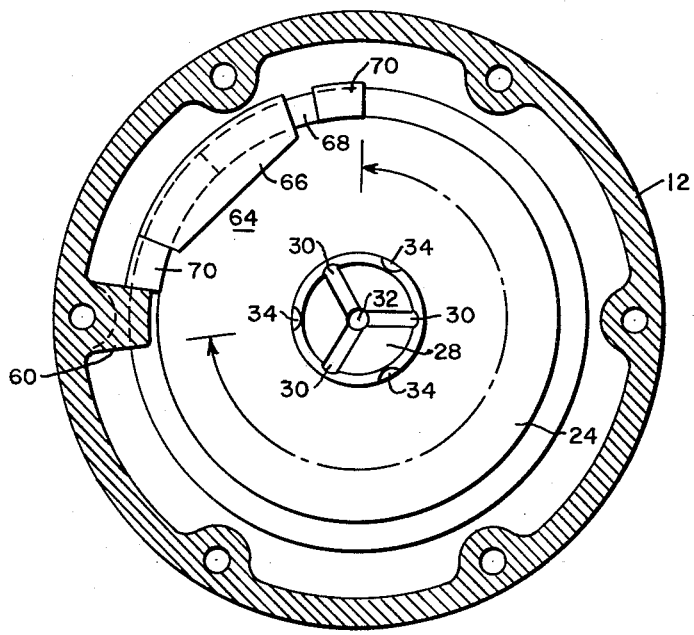
FIG. 2 is a transverse sectional view taken on line II—II of FIG. 1 looking in the direction of the arrows with knuckle bolt head removed.

Rocker plate 24 is normally stopped at the point shown in FIG. 2 by stop embossment 60 during reverse or counter clockwise rotation of the motor. When the motor starts in a clockwise direction shoes 46 and rocker plate 24 rotate with thrust runner 58 on knuckle bolt 14 since the friction moment on knuckle bolts 14 is many times smaller than the friction moment between the shoes 46 and the thrust runner 58. When damper head 70 on the rocker plate 24 engages stop embossment 60 on the side opposite that shown in the drawing the damper 68 damps rocker plate 24 down to a stop. When damper head 70 engages the stop embossment 60 it passes damper 68 through the damping cylinder 66. Part of the shock is absorbed by the friction between the damper 68 and the cylinder 66 due to a snug fit. The remaining shock is damped by backing the damper head 70 against the cylinder wall 66. It will of course be understood that the design of the damper could assume other forms. The form of damper shown in the drawing is by way of example only.

Thrust runner 58 starts to slide over thrust shoes 46 during the force of damping the movement of the rocker plate 24. The force which resists sliding of the shoes 46 on the runner 58 has a tendency to tilt the shoes 46 around the ball pivot 44 and to elevate the runner 58. The rocker plate stopping impact produces a force, which tips the shoes and opens the space between runner and shoes which allows a quick injection of lubricant between thrust runner 58 and shoes 46 and forms a low friction lubricant film. When the motor is stopped, in a motor pump device for example, the water head turns it in the reverse direction returning the rocker plate damper 68 to the original position shown in FIG. 2 ready for the next start. Because there is less than one turn of movement at low speed on the two sliding surfaces 36 and 38 and the seat has a small radius, not enough heat is developed to damage the spherical seat.

Thus a thrust bearing is disclosed, lubricated with water or other lubricant which automatically decreases the starting resistance due to friction approximately four times as compared with previous designs. The improvement consists essentially of allowing the support plate for the thrust shoes to turn nearly a full turn with the thrust runner when starting. This arrangement reduces the break away starting torque to that of the support plate on the knuckle bolt head 18 as its pivot, a value much less than the break away torque due to friction between runner and shoes.

Figure 3:
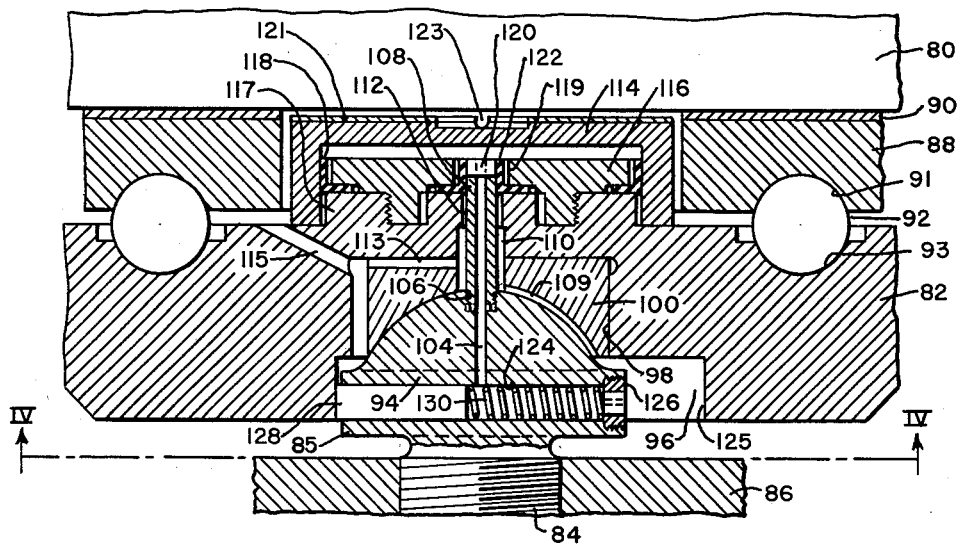
FIG. 3 is a longitudinal sectional view of another embodiment of this invention.
Figure 4:
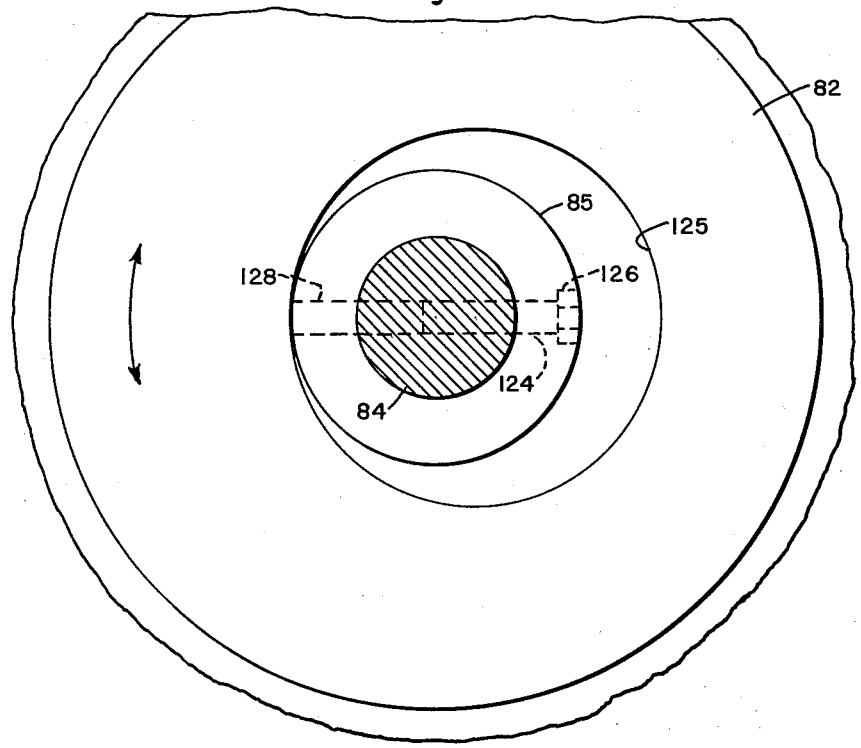
FIG. 4 is a cross-sectional view taken on line IV—IV of FIG. 3 looking in the direction of the arrows.

Another embodiment utilizing the similar principle of permitting the thrust shoes and their support plate to rotate with the thrust runner is employed in the embodiment shown in FIG. 3. In this embodiment there is disclosed a means for obtaining improved starting with a loaded thrust bearing as described in the FIG. 1 embodiment. However, the FIG. 1 embodiment was applicable only to those cases where a reverse rotation occurs after forward drive is stopped. The FIG. 3 embodiment facilitates starting of a power unit without a forced reverse rotation.

The construction of the bearing shown in FIG. 3 is basically similar to the construction of the embodiment shown and described in FIG. 1. A thrust runner 80 is provided which is adapted to be rigidly secured to a rotating shaft (not shown). A shoe support plate or rocker plate 82 is mounted on a rocker plate support or knuckle bolt 84 which is threadedly secured in a stationary bracket 86 partially shown. Thrust shoes 88 having bearing surfaces 90 of any suitable bearing material are pivotally mounted on rocker plate 82 by means of ball pivots 92. The thrust shoes 88 have hemispherical depressions 91 and the rocker plate 82 has circumferentially spaced hemispherical depressions 93. The depressions in rocker plate 82 are in alignment with the depressions in the thrust shoes 88. The ball pivots 92 are received intermediate the thrust shoe 88 and the rocker plate 82 in their respective hemispherical opposed depressions 91 and 93.

The knuckle bolt or rocker plate support 84 has supporting portion 94, formed by a disc shaped head with a spherical segment thereon. The disc shaped head portion of the supporting portion 94 and the spherical segment are of integral construction. The disc portion 85 of the head is of larger diameter than the base of the spherical segment. The shape of the supporting portion 94 of knuckle bolt 84 is clearly shown in FIG. 3.

The rocker plate 82 has bored in its lower surface an eccentric cylindrical recess 96. Within the cylindrical recess 96 there is a second cylindrical recess 98 which is concentric with respect to the rocker plate 82. Received in the concentric recess 98 is a concave bearing 100 which receives the convex surface of the spherical segment of supporting portion 94 of knuckle bolt 84. The bearing-seat 100 has bearing surfaces along its concave surface and on its outer surface which rides at the base of the recess 98. Channels 109, 111 and 113 in bearing-seat 100 and opening 115 in rocker plate 82 are provided for flow of lubricant through the bearing seat 100 and rocker plate 82. These channels permit lubricant to flow to the surfaces between the knuckle bolt 84 and the bearing seat 100, and to flow in the space above rocker plate 82.

A central bore 104 extending from the center of the convex surface of the supporting portion 94 to the center of the base of the spherical segment is provided. The central bore 104 is counter-bored as at 106 and threaded. A pressure pipe 108 is threadedly received in the countersunk, threaded portion 106 of supporting portion 94 and extends upwardly through a central opening 110 in bearing-seat 100 and a central bore 112 in rocker plate 82. The central bores 110 and 112 provide clearance for the pressure pipe 108 for self alignment of the rocker plate 82 on knuckle bolt 94 as will be more fully explained, hereinafter. A hollow piston 114 is disposed intermediate the rocker plate or thrust shoe support 82 and the thrust runner 80 on a centrally disposed embossment 117 on rocker plate 82. The piston 114 has an open bottom and is slidably received in close fitting relationship on an inner piston guide 116 which, in turn, is threadedly received in embossment 117. The inner piston guide or seal plate 116 is threadedly mounted on the inner surface of the embossment 117. A flange type sealing ring 118 is received on the periphery of the inner piston guide of seal plate 116. The sealing ring may be of any suitable material having a relatively low coefficient of friction which permits the piston to freely slide on the sealing ring. The inner piston guide 116 has a central opening 119 which receives a check valve 120 mounted on the upper end of the pressure pipe 108. A flange type seal ring 122 is provided about the inner periphery of the central opening in the inner piston guide 116 on the outer periphery of the check valve 120 and pressure pipe 108. The inner piston guide or seal plate 116 is supporting both seal rings 118 and 122. Fluid is pumped through the central opening 104 in the knuckle bolt head 94 through the pressure pipe 108 and check valve 120 to the underside of piston 114 which raises the piston to lift the thrust runner 80 off of the bearing shoes 88. The upper surface of piston 114 is a bearing surface 121 which serves as a bearing for the thrust runner 80 when the thrust runner 80 is raised off of the thrust shoes 88. The bearing surface 121 has several radial channels 123. Since the bearing surface 121 is already lubricated thrust runner 80 will start to slide on it.

In order to provide fluid under pressure to raise the piston 114, a pumping device is provided in the head of the knuckle bolt 94. Extending radially through the disc portion of the head of the knuckle bolt 94 is a cylindrical opening 124. Threadedly received in one end of the opening 124 is a suction valve 126. A plunger 128 is received in the cylindrical opening 124 and is spring biased radially outwardly by a coil spring 130 intermediate the suction valve 126 and the inner surface of the plunger 128. The plunger 128, spring 130 and suction valve 126, in combination with the wall 125 of the eccentric recess 96, provides a pumping device. The cylindrical opening 124 intersects the central opening 104 in the knuckle bolt 94 and fluid is pumped through the opening 104, pressure pipe 108 and check valve 120 to the piston 114.

When the thrust runner 80 begins to rotate due to starting of the unit, the rocker plate 82 begins to rotate with thrust runner 80 on the bearing 100 on the knuckle bolt head. This occurs because at the start the friction resistance between thrust runner 80 and the thrust shoe surface 90 is several times greater than the friction resistance between rocker plate 82 and the bearing-seat surfaces 100. The friction coefficient may be approximately the same; however, the friction radii are different. The wall 125 of the eccentric bore 96 in the rocker plate 82 pushes plunger 128 in knuckle bolt head 94 and presses the fluid into the space under piston 114 which is rotating with rocker plate 82. The piston 114 lifts the thrust runner 80 and unloads the thrust shoes 88. The clearance created between the thrust runner 80 and the shoes 88 provides a space for the formation of the lubricant film. Due to this film the friction resistance on the thrust shoes 88 will drop, and this will allow sliding of the runner 80 on the thrust shoes 88 when piston 114 drops down and puts runner plate 80 on thrust shoes 88. The rocker plate 82 will be slowed down and stopped by the friction drag of the knuckle bolt 94, plunger pump resistance on eccentric wall 125, and resistance to the turning of rocker plate 82, with thrust shoes 88 acting as a centrifugal pump. The top of the pistons 114 will act as a bearing 121 until the pressure under the piston 114 drops due to flow of the lubricant from the space under the piston to opening 110. The check valve 120, as an optional arrangement, may be used to maintain the pressure under the piston 114 for a longer period if so desired.

The hemispherical seat 100 between rocker plate 82 and knuckle bolt head 94 has sliding surfaces on both sides. The dual sliding surfaces on the bearing-seat 100 are purposely designed to protect sliding surfaces from excessive friction and wear. The sliding will always occur either on both sliding surfaces or on the sliding surface with less friction. The bearing-seat 100 is protected from high friction and heat concentration which is a major cause of bearing surface wear due to small speed, small friction radius, dual sliding surfaces and a minimum operating time, since the rotation of rocker plate 82 is limited to a few turns only. The heat generation is small, but the cooling of the bearing-seat 104 is increased through channels 109, 111, 113 and 115 due to increased flow of the lubricant from space below rocker plate 82 to space above rocker plate 82. It can be seen also that this arrangement of pivotal thrust shoes 88 and the rocker plate 82 on knuckle bolt 94 provides a self-aligning arrangement of the rocker plate 82. This arrangement is not disturbed by pressure pipe 108 because of the flexibility of the pressure pipe itself and the flexibility of the seal rings 118 and 122.

This bearing has built-in a self-protecting feature. If during a normal run the sliding surface between thrust runner 80 and thrust shoes bearing surface 90 is attacked by damaging particles, friction resistance will increase. In bearing designs where rocker plate 82 is prevented from turning the increased friction may produce enough heat and heat concentration to destroy the sliding surface quickly. But if the rocker plate 82 can turn, as it does in this construction, the plunger pump will be activated and lift runner 80 from shoes 88 allowing washing and cooling of the sliding surfaces. This will be repeated until the friction resistance on the shoe surfaces 90 drops down and smooth sliding over shoes 88 continues. The rocker plate 82 will always be stopped from turning by friction resistance on the bearing-seat 100, resistance of the plunger pump, and hydrodynamic resistance to the rotation of rocker plate. The turning of the rocker plate 82 will also considerably improve circulation of the lubricant between the shoes 88, acting as a centrifugal pump which will improve the cleaning and cooling action on the sliding surfaces contaminated by dirt particles.

It will therefore be seen that an improved thrust bearing has been provided which facilitates starting of a power unit with high starting thrust load and high starting friction resistance which is applicable to submersible pump-motor devices, as well as other units such as heavy waterwheels employing fluid lubrication. There are here shown and described two modifications, one applicable in cases where a reverse rotation can be made to occur after forward drive is stopped, such as would occur from the water head when a pump motor is stopped, or by simple mechanical means. Another modification is shown and described which does not require a reverse rotation when the motor is stopped, the latter providing a self-protecting feature, protecting the bearing from failure due to contamination by dirt particles during operation. Both of these modifications differ from standard designs in that the thrust plate is free to turn relative to its support almost a full turn in the first described embodiment or as many turns as needed in the latter embodiment. This device in a simple and effective manner makes it possible to automatically improve starting with a loaded thrust bearing, and high starting friction resistance. Certain specific embodiments of the invention have been shown and described for the purpose of illustration but it will be apparent that various other modifications are possible and are within the scope of the invention.

I claim as my invention:

1. A thrust bearing assembly comprising a thrust plate having pivotally mounted thrust shoes thereon, said thrust shoes forming a bearing surface, means for rotatably supporting said thrust plate, a rotatable shaft having a thrust collar mounted thereon for rotation therewith, said thrust collar having a bearing face adjacent said bearing surface, the friction moment between said bearing face and said bearing surface being greater than the friction moment between said thrust plate and said supporting means, and means for arresting rotation of said thrust plate relative to said supporting means after an amount of rotational movement sufficient to produce an impact on the arresting means which produces a force necessary to tilt the thrust shoes.

2. A thrust bearing assembly comprising a thrust plate, a central post having a semi-spherical, anti-friction head for rotatably supporting said thrust plate, a plurality of thrust shoes pivotally supported on said thrust plate for self-adjusting therewith, a rotatable shaft having a thrust collar mounted thereon for rotation therewith, said thrust collar having a smooth bearing surface adjacent said thrust shoes, the friction moment between said bearing face and said thrust shoes being greater than the friction moment between said thrust plate and said anti-friction head, and means for arresting rotation of said thrust plate relative to said anti-friction head after a substantial amount of rotational movement.

3. A thrust bearing assembly comprising a thrust plate having a bearing surface, means for rotatably supporting said thrust plate, a rotatable shaft having a thrust collar secured thereto for rotation therewith, said thrust collar having a bearing face adjacent said bearing surface, the friction moment between said bearing face and said bearing surface being greater than the friction moment between said thrust plate and said supporting means, and stop means for arresting rotation of said thrust plate relative to said supporting means after a substantial amount of rotational movement.

4. A thrust bearing assembly comprising a thrust plate having a bearing surface, means for rotatably supporting said thrust plate, a rotatable shaft having a thrust collar mounted thereon for rotation therewith, said thrust collar having a bearing face adjacent said bearing surface, the friction moment between said bearing face and said bearing surface being greater than the friction moment between said thrust plate and said supporting means, piston means for separating said bearing face and said bearing surface to permit entry of lubricant therebetween, and pump means actuated by rotation of said thrust plate relative to said supporting means for actuating said piston means.

5. A thrust bearing assembly comprising a thrust plate, a central post having a semi-spherical, anti-friction head for rotatably supporting said thrust plate, a bearing surface on said thrust plate, a rotatable shaft having a thrust collar mounted thereon for rotation therewith, said thrust collar having a smooth bearing face adjacent said bearing surface, the friction moment between said bearing face and said bearing surface being greater than the friction moment between said thrust plate and said supporting means, piston means for separating said bearing surface and said bearing face to permit entry of lubricant therebetween, pump means extending transversely across said semi-spherical head for actuating said piston, a recess in said thrust plate eccentrically disposed with respect to the semi-spherical head, a portion of the wall of said eccentric recess engaging and actuating said pump means upon rotating of said thrust plate relative to said semi-spherical head.

6. A thrust bearing assembly adapted to be immersed in a lubricating medium comprising a thrust plate support, a thrust plate having a central spherical recess centrally supported on said thrust plate support, said thrust plate being mounted for rotation on said support, said thrust plate having a plurality of bearing segments rockably mounted on its surface opposite from said recess, a rotatable shaft having a thrust collar mounted thereon or for rotation therewith, said thrust collar having a bearing face riding on said bearing segments, the friction moment between said bearing face and said bearing segments being greater than the friction moment between said thrust plate and said support, and means for introducing lubricant between said bearing segments and said bearing face after initial rotation of said thrust plate on said support.

7. A thrust bearing assembly adapted to be immersed in a lubricating medium comprising a spherical thrust plate support, a thrust plate having a central spherical recess receiving said thrust plate support, said thrust plate being mounted for rotation on said support, said thrust plate having a plurality of rockably mounted bearing shoes on its surface opposite from said recess, a rotatable shaft having a thrust collar mounted thereon for rotation therewith, said thrust collar having a bearing face riding on said bearing shoes, the friction moment between said bearing face and said bearing shoes being greater than the friction moment between said thrust plate and said support, and means for separating said thrust collar bearing face from said bearing shoes after initial rotation of said bearing face on said bearing shoes.

8. A thrust bearing assembly adapted to be immersed in a lubricating medium comprising a thrust plate, said thrust plate rotatably mounted on a support, a plurality of bearing shoes rockably mounted on said thrust plate, a rotatable shaft having a thrust collar mounted thereon for rotation therewith, said thrust collar having a bearing face riding on said bearing shoes, the friction moment between said bearing face and said bearing shoes being greater than the friction moment between said thrust plate and said support, means for initiating relative rotation between said bearing face and said bearing shoes after an initial substantial amount of relative rotational movement between said thrust plate and said support, whereby the force resisting sliding of said face on said shoes rocks the shoes on their pivots permitting the lubricating medium to enter the space between the bearing face and the shoes.

9. A thrust bearing assembly comprising a thrust plate, said thrust plate rotatably mounted on a support and having a bearing surface, a rotatable shaft having a thrust collar mounted thereon for rotation therewith, said thrust collar having a bearing face adjacent said bearing surface, the friction moment between said bearing face and said bearing surface being greater than the friction moment between said thrust plate and said support, and means for initiating relative rotation between said bearing surface and said bearing face after an initial amount of rotational movement sufficient to cause separation between the thrust plate bearing surface and the thrust collar bearing face.

References Cited in the file of this patent

UNITED STATES PATENTS

| | | |
|---|---|---|
| 1,173,369 | Moore | Feb. 29, 1916 |
| 2,779,637 | Schaefer | Jan. 29, 1957 |